Feb. 15, 1944.           R. W. JOHNSON           2,341,785
                    DUAL OIL CONTROL DEVICE
                    Filed Jan. 12, 1940           3 Sheets-Sheet 1
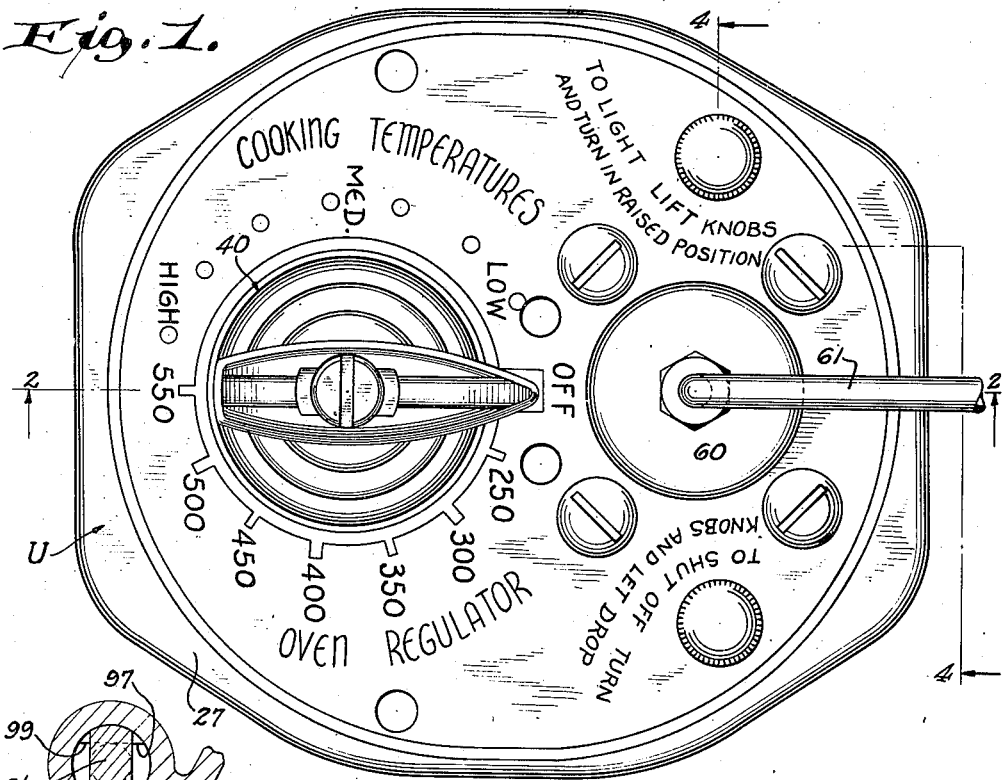
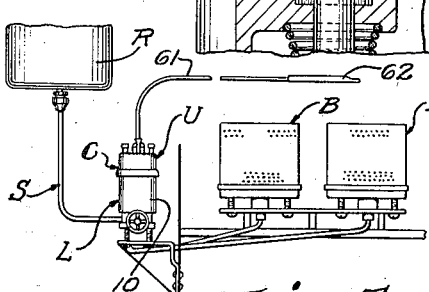
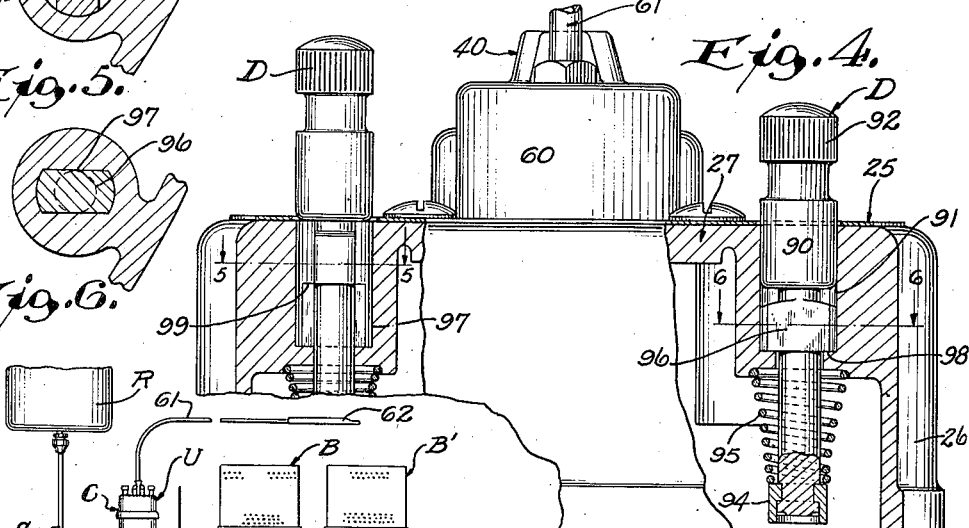
INVENTOR
ROY W. JOHNSON
BY John W. Michael
ATTORNEY Feb. 15, 1944.  R. W. JOHNSON  2,341,785
DUAL OIL CONTROL DEVICE
Filed Jan. 12, 1940  3 Sheets-Sheet 2

INVENTOR
ROY W. JOHNSON
BY John W. Michael
ATTORNEY

Feb. 15, 1944.   R. W. JOHNSON   2,341,785
DUAL OIL CONTROL DEVICE
Filed Jan. 12, 1940   3 Sheets-Sheet 3
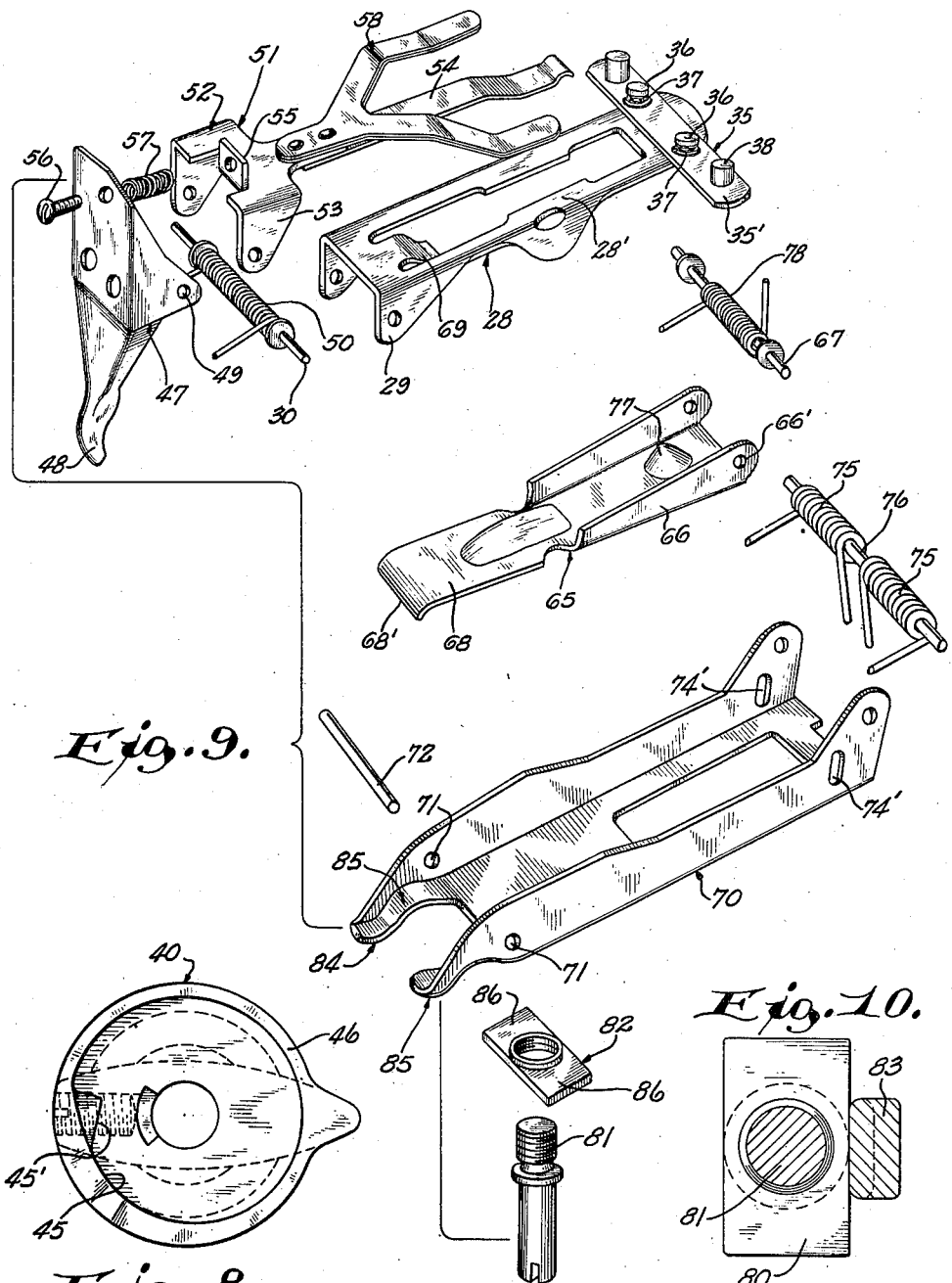
INVENTOR
ROY W. JOHNSON
BY John W. Michael
ATTORNEY Patented Feb. 15, 1944

2,341,785

UNITED STATES PATENT OFFICE 2,341,785

DUAL OIL CONTROL DEVICE

Roy W. Johnson, Milwaukee, Wis.

Application January 12, 1940, Serial No. 313,565

12 Claims. (Cl. 236—99)

This invention relates to an oil control device especially designed and adapted for use with oil-burning ranges or cooking stoves of the type utilizing one or more gravity feed oil burners as the source of heat.

One of the objects of the invention is to provide an oil-burning device of this character which affords complete and convenient control over both top stove cooking and oven temperatures.

Another object of the invention is to provide a control device of this character, which, while selective and flexible, highly simplifies the problem of control for the user of the stove, especially in that, after the selection is made, the operation becomes entirely automatic.

A further object of the invention is to provide a device of this character, which is compact and closely organized, which is safe and reliable in operation, durable in construction, and which may be manufactured and installed with economy and convenience.

Gravity feed oil burners of the type contemplated by the present invention require a constant level device between the tank or reservoir for the fuel and the burner. Such constant level devices are familiar in the art, and include generally a casing having a liquid supply chamber provided with an inlet connected to the tank or reservoir. An inlet valve regulates the flow of the liquid fuel into the supply chamber, and is controlled in its action by a liquid level control means, usually in the form of a float buoyed in the liquid in the supply chamber and connected to the valve through a lever mechanism. One or more outlets lead from the supply chamber to the burner or burners. The flow of liquid fuel through each outlet is controlled by a metering valve. Each metering valve is biased to open position by means of a spring, and is controlled as to its maximum open or so-called high fire position by means of a high fire stop which is carried by the casing and acts directly on the valve to limit the opening movement thereof independently of the other control instrumentalities.

The control mechanism embodying the present invention includes a valve operating lever which directly engages the metering valve and is so mounted as to function to move the valve towards closed position when swung in one direction and to allow the valve to open under influence of its own bias when swung in the other direction. The extent to which the valve operating lever may function to close the valve is limited by means of a low fire stop which engages the lever and limits its swing in the direction in which it is operable to close the valve.

In order to adapt a control device of this character to regulate either top stove or oven cooking, instrumentalities are provided which cooperate with the valve-operating lever to render it properly responsive either to manual or thermostatic control. In carrying out this purpose two actuating levers are combined with the valve-operating lever, one actuating lever being responsive to a manual setting, and the other actuating lever being responsive to the influence of a thermally controlled device, such as the conventional bellows, capillary tube, bulb combination, or the like. Furthermore, these two actuating levers and their respective control means are so interrelated that when one is thrown into action the other is thrown out of action, and all of this is accomplished by the manipulation of a single control knob. To effect this close organization of structure, and this simplicity and dual responsiveness to control, the control knob is specially constituted in that it has combined therewith a cam which functions through suitable motion transmission mechanism to determine the actuation and the setting of the actuating lever responsive to the manual control. The control knob is also combined with a screw and nut mechanism which functions to bring the other actuating lever into or out of range of action to the thermally controlled device. And finally, the burner or burners may be manually turned off at any time independently of the manual or thermostatic setting.

Other objects and advantages reside in certain novel features of the construction, arrangement, and combination of parts, which will be hereinafter more fully described and particularly pointed out in the appended claims, reference being had to the accompanying drawings forming a part of this specification, and in which:

Figure 1 is a top plan view of a control device embodying the present invention.

Figure 4 is a fragmentary view partly in side elevation and partly in vertical cross section on the plane of line 4—4 of Figure 1.

Figures 5 and 6 are detail sectional views taken on lines 5—5 and 6—6, respectively, of Figure 4, and illustrating the manually operable shut-offs provided for the metering valves.

Figure 7 is a diagrammatic view in elevation showing the installation of a control device embodying the present invention.

Figure 8 is a view in bottom plan of the manually operable control knob.

Figure 2:
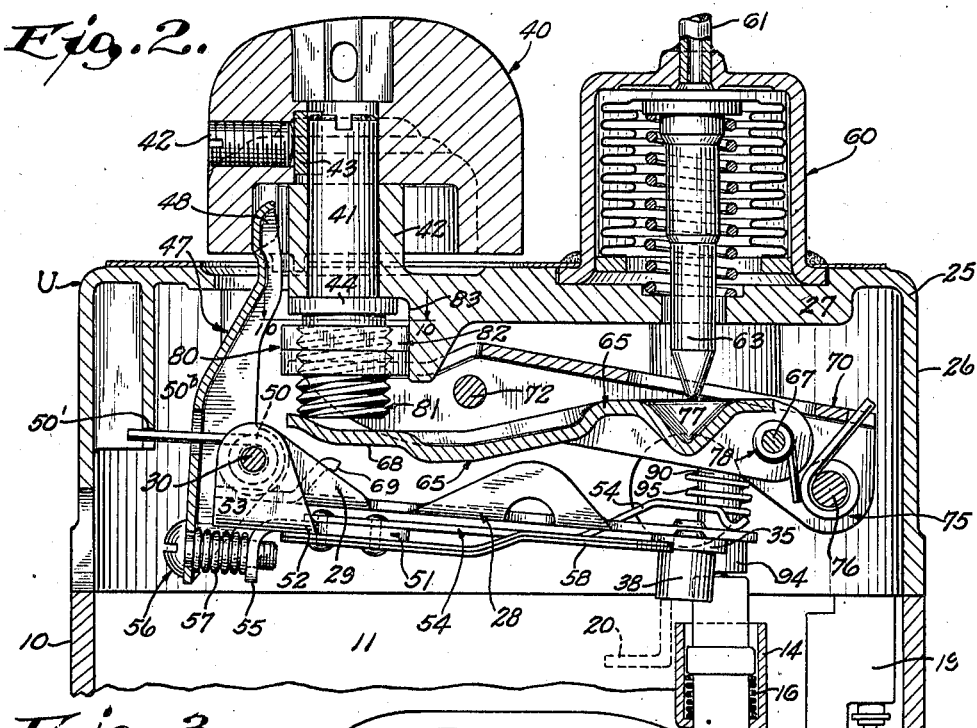
Figure 2 is a view thereof in vertical cross section, taken on line 2—2 of Figure 1, and also illustrating diagrammatically the metering valve of the constant level device with which the present invention is combined.
Figure 3:
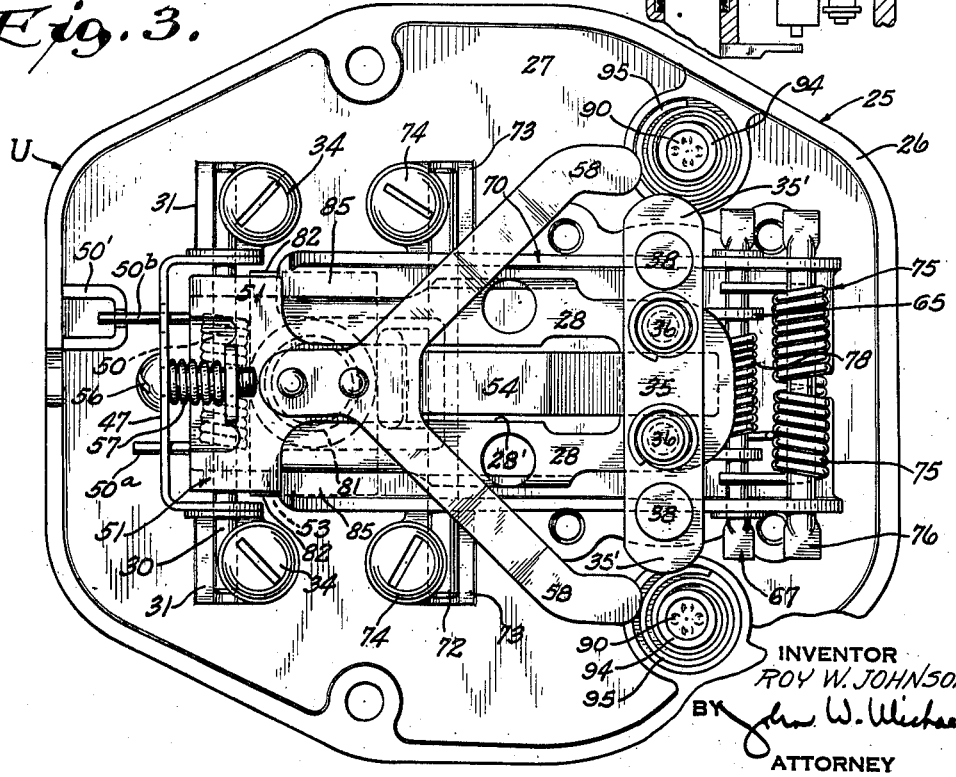
Figure 3 is a view in bottom plan of the structure shown in Figure 2, the diagrammatic illustration of the constant level device being omitted.

Figure 9 is a group view in perspective illustrating the elements of the mechanism interposed between the control knob and bellows and the metering valve; and Figure 10 is a detail sectional view taken on line 10—10 of Figure 2.

In the drawings, referring especially to Figure 7, the control device embodying the present invention is designated generally at C, and is interposed between a tank or reservoir R for the liquid fuel and one or more burners designated at B and B'. The burners B and B' are, of course, combined with a suitable type of cooking stove, range, or other heater (not shown). The control device C embodies a constant level mechanism, designated at L, and a control unit U, the latter including the instrumentalities of the present invention and being mounted on the top of the constant level device L.

The constant level device L includes a casing 10 having a main liquid supply chamber 11 therein. Liquid fuel is supplied to the chamber 11 through a supply line S and is maintained at a constant level therein by mechanism which per se forms no part of the present invention, and which is fully disclosed in United States Letters Patent 2,068,138, granted January 19, 1937, to Roy W. Johnson. The liquid supply chamber 11 is provided with one or more fuel outlets and flow of the liquid fuel through each of these outlets is regulated by means of a metering valve 14. Each metering valve 14 is biased to open position by means of a spring 16 and is limited in its opening movement by means of a high fire stop 19. The construction of each metering valve 14, of its high fire stop 19, and of the low fire stop 20, which will be hereinafter more fully described, also per se form no part of the present invention but are fully disclosed in the application of Roy W. Johnson for "Interchangeable metering valve control," filed June 23, 1938, Serial No. 215,336, Patent No. 2,244,161.

The control unit U embodying the present invention includes a casing 25 made up of a peripheral wall 26 and a top wall 27. The casing 25 is open at the bottom. It is fitted on and suitably secured to the top of the casing 10 of the constant level mechanism.

A valve-operating lever 28 is pivotally supported within the casing of the control unit U and is operatively interrelated with the metering valve or valves, with one metering valve where one is utilized, and with both where two are utilized. Preferably the valve-operating lever 28 is constituted of a sheet metal stamping shown in detail in Figure 9. At one end the valve-operating lever 28 is provided with a pair of oppositely disposed apertured ears 29. A pivot or fulcrum pin 30 is extended through the apertures of the ears 29. The ends of this pin 30 are fitted in grooves provided therefor in mounting lugs 31, which may be cast integral with the top of the casing of the control unit U. The ends of the pivot pin 30 are held in the grooves of the mounting lugs by means of screws 34, which are threaded into threaded apertures provided therefor in the mounting lugs adjacent the grooves so that the heads of the screws overlap and clamp the pivot pin in place. At the end of the valve-operating lever opposite its pivotal mounting it is provided with a cross strip 35, the outer ends 35' of which overlie and are directly engageable with portions of the upper ends of the metering valves 14. Where control is exerted over two metering valves, the cross strip 35 is flexibly attached to the lever 28 so as to function as an equalizer. This may be accomplished by providing headed studs 36 which have their shanks fixed to the lever and extended through openings in the strip and which are combined with short coil springs 37, the springs 37 being interposed between the heads of the studs and the strip. Where the strip is utilized to actuate only one metering valve, it is fixedly secured to the valve-operating lever. Buttons 38 are fixed to the strip 35 and overlie and are engageable with the low fire stops 20. The valve-operating lever 28, when thus mounted and constituted, is effective when swung in one direction, namely in a clockwise direction, as viewed in Figure 2, to move the metering valve or valves toward closed position, this action being, of course, against the bias of the valves. The extent to which the valve-operating lever may move the valve or valves toward closed position is limited by the engagement of the buttons 38 of the cross strip of the valve-operating lever with the low fire stop or stops 20. When the valve-operating lever 28 is swung in the opposite direction, namely in a counter-clockwise direction as viewed in Figure 2, the lever 28 and its cross strip 35 move away from the metering valve or valves and allows them to move toward open position under the influence of their own bias. The amplitude of the movement of the valve-operating lever 28 away from the valves is such as to allow the valves to fully open, the extent of their full opening movement being limited not by the lever 28 but by their high fire stops 19.

The position of the valve-operating lever is controlled by two instrumentalities, one manually and the other thermostatically operated, both, however, being interrelated and coordinated in their action. Both instrumentalities are regulated or controlled from a control knob, designated generally at 40. The control knob 40 is disposed above the top of the casing of the control unit and is conveniently manipulated from the exterior. It is supported in position on the top of the control unit by means of a shaft 41 rotatably fitted in a bearing sleeve 42 cast integral with the top of the control unit. The shaft 41 is adjustably fixed to the knob by means of a set screw 42, a shoe 43 being interposed between the set screw and the shaft 41 to prevent scuffing of the shaft although providing for clamping as well as adjustment. The set screw and its shoe rotatively couple the shaft and knob together, and also preclude any relative axial movement of the shaft 41 and knob 40. The recessed under face of the knob engages the upper end of the bearing sleeve 42 to hold the shaft 41 as well as the knob 40 against downward axial displacement. A collar 44 formed integral with the shaft engages the lower end of the bearing sleeve 42 to prevent upward axial displacement of the shaft. The structure is such as to mount the shaft and knob for rotation while holding both against axial movement. The under side of the knob in the portion thereof which surrounds the bearing sleeve is recessed, and the peripheral wall of the recess is provided with a cam surface designated at 45. The cam surface 45 extends only approximately half way about the periphery of the knob and the portion thereof which is located at the greatest distance from the center of rotation merges into an arcuate surface 46. The cam surface 45 is utilized to effect manual control over the valve-operating lever 28. The arcuate surface 46 is provided to free the valve-operating lever 28 of manual control and leave it responsive to thermostatic control. A follower lever 47 has a rounded toe 48, which directly although selectively cooperates with the cam surface 45 and the arcuate surface 46. This follower lever 47 is shown in detail in Figure 9 although in Figure 9 it is inverted (for purpose of illustration only). As illustrated, it also is constituted of a sheet metal stamping, and the portion thereof opposite its cam engaging toe 48 is of channel-shaped form and has oppositely alined pivot openings 49 through which the same pivot pin that fulcrums the valve-operating lever 28 extends. A coil spring 50 encircles the pivot pin 30 and has its terminals extended through openings in the body of the follower lever, one terminal 50a engaging the wall of its opening so as to bear against the lever, the other terminal 50b extending through a large opening in the lever so as to be free of the lever and adapt it to bear or react against an abutment 50' provided therefor on the wall of the housing of the control unit. The follower lever 47 transmits the motion from the cam 45 of the control knob 40 to the valve-operating lever 28 through an actuating lever designated generally at 51. The actuating lever 51 is of composite construction. It includes a sheet metal stamping 52 having oppositely disposed apertured ears 53 which also are pivotally mounted or fulcrumed on the pivot pin 30. The body portion of the sheet metal stamping 52 of the metering lever 51 has a spring arm 54 riveted or otherwise suitably affixed thereto. The spring arm 54 extends through a slot 28' formed in the body portion of the valve-operating lever 28, and its outer end is offset and shaped to engage the top of the outer end of the operating lever 28, as clearly shown in Figure 2. In Figure 9 the parts are inverted to better illustrate their shape and structure. The sheet metal body of the valve-actuating lever 51 has integrally formed therewith a lug 55 which is provided with an internally threaded opening. The internally threaded opening of the lug 55 is alined in the assembly with an opening provided in the body portion of the follower lever. A screw 56 is extended through the opening in the follower lever and threaded into the opening in the lug 55 to rigidly although adjustably connect the follower lever and the valve-operating lever. A coil spring 57 may be disposed on the shank of the screw to releasably maintain the screw in any selected adjustment.

With this arrangement, when the knob 40 is turned to bring the cam surface 45 against the toe 48 of the follower lever 47, the follower lever is swung back and forth, and this motion is communicated to the valve-actuating lever 51. When the knob is turned in one direction (with cam 45 and toe 48 engaged) the valve-actuating lever 51 is so swung that its spring arm 54 moves downwardly or in a clockwise direction, as viewed in Figure 2. In so moving, lever 51 moves the valve-operating lever 28 downwardly and the valve-operating lever 28 in turn moves the metering valve 14 toward closed position. Reverse movement of the knob reversely moves the follower lever 47 and the valve operating lever 28, and consequently allows the valve to move toward open position under the influence of its own bias. The cam surface 45 of the knob 40 is constituted not only to provide for the manual setting of the valve at various points between its low pilot fire position and its high fire position, but also has an inwardly abrupt or extreme dwell 45' adapted to function to shut off or fully close the valve. In exercising this function of fully closing or shutting off the valve, the knob acts through the dwell 45', the follower lever 47, and the valve-actuating lever 51 (notwithstanding that the valve-actuating lever 51 is limited in its movement in a direction to close the valve due to the engagement of its cross strip 35 with the low fire stops 20) by virtue of the fact that the spring arm 54 of the lever 51 may flex and thus allow the actuating lever 51 to move the spring fingers 58 also riveted to the body of the actuating lever 51 and disposed on opposite sides of the spring arm 54 and dimensioned and proportioned so that their outer ends overlie corners of the metering valve.

For the purpose of exercising thermostatic control over the metering valves, a bellows construction designated generally at 60 is combined with the top of the casing of the control unit. A capillary tube 61 leads from the bellows 60 to a bulb 62 which is disposed in or exposed to the oven temperatures. The bellows, capillary tube and bulb are, of course, charged with a fluid which expands and contracts in response to changes of temperature to which the bulb 62 is exposed. The bellows construction includes an operating stud 63 which projects down into the casing of the control unit U, and is designed to coact with the second valve-actuating lever designated generally at 65, when the device is set for thermostatic control.

The actuating lever 65 may also be of stamped sheet metal, and likewise is shown in detail in Figure 9. A portion 66 of the lever 65 is generally of channel-shaped formation, and the end of such portion is provided in its side flanges with transversely alined openings 66' designed to receive the pivot or fulcrum pin 67 upon which the actuating lever 65 is mounted. Beyond its channel-shaped portion the lever 65 is a tongue-like extension 68, which is upcurved at its extremity, as indicated at 68'. The extension 68' of the actuating lever 65 overlies a corresponding though smaller upwardly directed tongue-like extension 69, which is integral with the valve-operating lever 28. When the device is set for thermostatic control, and the actuating lever 65 is functioning to regulate the position of the metering valve or valves which it controls, the tongue-like extension 68 is engaged with the tongue-like extension 69 so that as the lever 65 moves downwardly it swings the valve-operating lever 28 in a direction to move the metering valve or valves toward closed position. As the actuating lever 65 swings upwardly, it frees the valve-operating lever and allows the metering valve to open under the influence of their own biasing.

For the purpose of moving the valve-actuating lever 65 into and out of operation, and also determining the height of the flame of the burner, and consequently the heat to be maintained, the fulcrum or pivot pin 67, upon which the actuating lever 65 is mounted, is in turn supported on an adjusting lever 70. The adjusting lever 10 may also be constituted of a sheet metal stamping shaped as shown in detail in Figure 9. It is generally of channel shape and has its side flanges at one end provided with transversely alined openings to receive its fulcrum or pivot pin 72. The pivot pin 72 is also mounted in grooved lugs 73 cast integral with the casing of the control unit and is held in place by screws 74 which function like the screws 34.

The actuating lever 65 and its adjusting lever 70 are pivoted together in a special manner in order to take care of certain conditions of overtravel and protect the bellows in a manner which will be hereinafter more fully described. The structure provided for this purpose includes the pivot or fulcrum pin 67 of the adjusting lever, and also includes slots 74' in the side flanges of the adjusting lever 70 through which the ends of the pivot pin 67 extend, and in which such ends of the pivot pin are slidably fitted.

The pivot pin 67 is normally held against the upper ends of the slot 74' by means of springs 75 which are mounted on a spring supporting pin 76. The springs 75 are coil springs with the ends of the coils extended. One terminal of each coil spring bears against the adjusting lever 70 and the other terminal of each coil spring bears against an end portion of the pivot pin 67.

The body portion of the actuating lever 65 is formed with a conical seat or socket 77, which underlies the pointed end of the bellows operating stud 63, and when the device is adjusted for thermostatic control the lower tapered end of the bellows stud is engaged in and bears against the conical socket 77. A spring 78 is provided for urging the actuating lever 65 to swing in a direction to cause its seat or socket 77 to bear against the lower pointed end of the bellows stud 63. This spring is also a coil spring with the convolutions of the coil encircling the pivot pin 67. One terminal of the coil spring 78 bears against the supporting pin 76 and the other end bears upwardly against the underside of the actuating lever to urge it upwardly toward the bellows stud.

The position of the adjusting lever 70, and consequently of the actuating lever 65, is controlled from the knob 40 by a screw and nut mechanism designated generally at 80. This screw and nut mechanism comprises a screw 81 which may be conveniently formed by threading the lower end of the shaft 41. A flanged nut 82 is threadedly engaged with the screw 81 and is constrained against turning movement although permitted to feed axially of the screw by virtue of engagement of one of its straight edges with a guide or track-way 83 machined on an integral part of the top of the casing of the control unit. The nut 82 overlies the yoked end 84 of the adjusting lever 70, and the arms 85 of the yoked end are shaped and formed so as to have the proper bearing engagement with the flanges 86 of the nut.

With this construction, when the knob is turned in one direction, the shaft 41 also turns and causes the screw to feed the nut 82 downwardly whereupon its flanges 86 bear down on the arms 85 of the yoked end of the lever 70 and swing the lever about its fulcrum pin 72 in a counterclockwise direction, as viewed in Figure 2, thereby bringing the actuating lever 65 into engagement with and under the control of the bellows stud 63. Simultaneously, with this movement of the screw and nut mechanism, and of the levers 70 and 65, the follower lever 47 is shifted into engagement with the arcuate portion 46 of the cam of the knob with the result that the valve-actuating lever 51 is swung to a position where it can exercise no control of the metering valve.

In order to provide for shutting off of either metering valve independently of the control knob, a separate or individual valve closure device is provided for each metering valve. These valve closure devices are designated at D in Figure 4, and are of identical construction. Each comprises a stem 90 slidably fitted in a vertical opening 91 provided therefor in the top of the control casing, and also, in certain adjustments, capable of rotation with respect to their operating openings. The upper end of each stem is knurled, as at 92, to adapt it to be lifted and turned. The lower end of each stem is provided with a collar 94 designed to engage and close the underlying metering valve 14 when the stem is lowered. A spring 95 interposed between the under side of the top of the casing and the collar 94 biases the stem downwardly, that is, tends to move it to a position wherein it is effective to punch its metering valve closed. The portion of the stem designated at 96 is flattened or of non-circular cross section, and this portion slides in a correspondingly formed part 97 of the stem-receiving bore, in order to provide for latching the valves D in inoperative position, such latching being effected by pulling up on either stem and giving the stem to a partial turn to bring the shoulders 98 of the flattened portion of the stem into engagement with the shoulders 99 of the correspondingly formed part of the portion. Reverse or further turning of the stems will bring the flattened portions 96 into alinement with their correspondingly formed bores and permit them to be pushed down to valve-closing position by their respective springs.

While I have shown and described one construction in which the invention may be advantageously embodied, it is to be understood that the construction shown has been selected merely for the purpose of illustration or example, and that various changes in the size, shape, and arrangement of the parts may be made without departing from the spirit of the invention or the scope of the subjoined claims.

I claim:

1. A control device for gravity feed oil burners comprising a casing having a liquid supply chamber provided with an outlet, a metering valve regulating flow through said outlet and biased to open position, a valve-operating lever cooperable with the valve to move the same toward closed position when swung in one direction and to allow the valve to open when swung in the other direction, thermostatic means, a single manually settable control knob, an actuating lever cooperable with the valve-operating lever, cam means actuated by said knob for controlling the position of said actuating lever, a second actuating lever, screw and nut mechanism actuated by said knob, and operatively interrelated with said second actuating lever to move the same into the range of control of said thermostatic means and into cooperation with said valve-operating lever when said knob is adjusted to cause the cam means to move the first-named actuating lever out of controlling relation to said valve-operating lever.

2. A control device of the type wherein a biased metering valve is controlled as to position by means of a valve-operating lever and comprising a manually settable control knob, thermo-responsive means including a bellows, an actuating lever for the valve-operating lever, cam means actuated by the knob and cooperable with the actuating lever to regulate its position, screw and nut mechanism actuated by the knob, and a second actuating lever operatively interrelated with the screw and nut mechanism so as to be thrown into the range of action of the bellows and into controlling relation to the valve-operating lever when the knob is adjusted to shift the first-named actuating lever out of controlling relation to the valve-operating lever.

3. A control device of the type wherein a biased metering valve is shifted from its low to its high fire position under the influence of a valve-operating lever and comprising a manually settable control knob, thermostatic means, cam means actuated by said knob, an actuating lever controlled as to position by said cam means and operatively interrelated with said valve-operating lever so as to be effective to control the position thereof under the influence of said cam means, screw and nut mechanism also actuated from the said knob, and a second actuating lever controlled as to position by said screw and nut means so as to be thrown within the range of action of the thermostatic means when the knob is set to shift the first-named actuating lever out of controlling relation to the valve-operating lever.

4. A control device of the type wherein a biased metering valve is shifted from its low to its high fire position under the influence of a valve-operating lever and comprising a manually settable control knob, thermostatic means, cam means actuated by said knob, an actuating lever controlled as to position by said cam means and operatively interrelated with said valve-operating lever so as to be effective to control the position thereof under the influence of said cam means, screw and nut mechanism also actuated from the said knob, an adjusting lever controlled as to position by said screw and nut mechanism, and a second valve actuating lever fulcrumed on the adjusting lever and adapted to be brought into the range of action of the thermostatic means and into controlling relation to the valve-operating lever when the knob is adjusted to throw the first-named actuating lever out of controlling relation with the valve-operating lever.

5. A control device for gravity feed oil burners, comprising a casing having a liquid supply chamber provided with an outlet, a metering valve regulating the flow through said outlet and biased to open position, a high fire stop cooperable with the valve for regulating its maximum opening, a valve-operating lever cooperable with the valve to move the same toward closed position when swung in one direction and to allow the same to open when swung in the other direction, a low fire stop cooperable with said lever for limiting the extent to which it may move the valve toward closed position, a single manually settable control knob, thermostatic means, cam means actuated by said knob, an actuating lever controlled by the cam means and cooperable with the valve-operating lever to regulate the position thereof, screw and nut mechanism actuated from the knob, an adjusting lever controlled as to position by said screw and nut mechanism, and a second actuating lever fulcrumed on the adjusting lever and adapted to be brought into the range of action of the thermostatic means and into cooperative relation with the valve-operating lever when the knob is adjusted to a position to throw said first-named actuating lever out of controlling relation to the valve-operating lever.

6. A control device for gravity fuel oil burners of the type having a metering valve, an operating lever for the valve and high and low fire stops cooperable with the valve and operating lever respectively and comprising a single manually settable control knob, thermostatic means, cam means actuated by said knob, an actuating lever controlled as to position by said cam means and having a yieldable connection with said valve-operating lever, screw and nut mechanism actuated by said control knob, a second actuating lever adapted to be shifted into the range of action of said thermostatic means and into cooperative relation with the valve-operating lever when the control knob is adjusted to a position to throw the first-named actuating lever out of controlling relation to the valve, said cam means including a high dwell effective to shift the first-named actuating lever to a position beyond that required to bring the valve to its low fire position, and a finger carried by said first-named actuating lever and directly cooperable with the valve for shifting the same to fully closed position when said high dwell is effective.

7. A control device of the character described comprising a valve-operating lever, a manually settable control knob, thermostatic means, an actuating lever for the valve-operating lever, cam means actuated by the knob and cooperable with the actuating lever to regulate its position, motion transmission means actuated by the knob, and a second actuating lever operatively interrelated with the motion transmission means so as to be moved into the range of action of said thermostatic means and into controlling relation to the valve-operating lever when the knob is adjusted to shift the first-named actuating lever out of controlling relation to the valve-operating lever.

8. A control device of the character described comprising a casing, a valve-operating lever therein, a shaft rotatably supported on the casing, a manually settable control knob fixed to the shaft exteriorly of the casing, said shaft projecting into the casing, a rotary cam carried by the knob, an actuating lever for the valve-operating lever disposed within the casing and cooperable with the valve-operating lever, a follower lever coacting with the cam and operatively connected to said actuating lever, a bellows supported on the casing and having its operating stud projecting into the casing, an adjusting lever supported in the casing, a second actuating lever for the valve-operating lever fulcrumed on the adjusting lever, and screw and nut mechanism actuated by said shaft and cooperable with the adjusting lever to bring the second actuating lever into cooperative relation with the operating stud of the bellows and into controlling relation to the valve-operating lever when the knob is turned to cause its cam to shift the first-named actuating lever out of controlling relation to the valve-operating lever.

9. A control device of the character described comprising a casing, a valve-operating lever therein, a shaft rotatably supported on the casing, a manually settable control knob fixed to the shaft exteriorly of the casing, said shaft projecting into the casing, a rotary cam carried by the knob, an actuating lever for the valve-operating lever disposed within the casing and cooperable with the valve-operating lever, a follower lever coacting with the cam and operatively connected to said actuating lever, a bellows supported on the casing and having its operating stud projecting into the casing, an adjusting lever supported in the casing, a second actuating lever for the valve-operating lever, means pivotally mounting the second actuating lever on the adjusting lever and providing for limited bodily movement thereof against a yielding resistance, and screw and nut mechanism actuated by said shaft and cooperable with the adjusting lever to bring the second actuating lever into cooperative relation with the operating stud of the bellows and into controlling relation to the valve-operating lever when the knob is turned to cause its cam to shift the first-named actuating lever out of controlling relation to the valve-operating lever.

10. A control device for gravity fuel oil burners of the type having a metering valve, an operating lever for the valve, and high and low fire stops cooperable with the valve and lever respectively and comprising a casing enclosing the operating lever, a shaft rotatably supported on the casing, a manually settable control knob fixed to the shaft exteriorly of the casing, said shaft projecting into the casing, a rotary cam carried by the knob, an actuating lever for the valve-operating lever disposed within the casing, a yieldable connection between the actuating lever and the valve-operating lever, a follower lever coacting with the cam and operatively connected to said actuating lever, a bellows supported on the casing and having its operating stud projecting into the casing, an adjusting lever supported in the casing, a second actuating lever for the valve-operating lever, said second actuating lever being fulcrumed on the adjusting lever, screw and nut mechanism actuated by said shaft and cooperable with the adjusting lever to bring the second actuating lever into cooperative relation with the operating stud of the bellows and into controlling relation with the valve-operating lever when the knob is turned to cause its cam to shift the first-named actuating lever out of controlling relation to the valve-operating lever, said rotary cam having a high dwell effective in one angular adjustment of the cam to shift the actuating lever to a position beyond that required to bring the valve operating lever into engagement with the low fire stop, and a finger carried by said first-named actuating lever and directly cooperable with the valve for shifting the same to fully closed position when said high dwell of the cam is in operative position.

11. A control device of the character described comprising a casing, a valve operator in said casing, a manually settable control knob mounted on the casing and adjustable from the exterior thereof, a thermally responsive power element mounted on the casing, and two sets of motion transmission mechanisms disposed within the casing and operatively interrelated with the valve operator and selectively, though separately and individually, actuated from the knob, one of said motion transmission mechanisms being thrown out of action by said knob when the other is thrown into action, whereby the knob may be utilized to manually adjust the valve operator or to place the valve operator under the control of said thermo-responsive power element.

12. A control device of the character described comprising a valve operator, a manually settable control element, a thermally responsive power element, and two motion transmission trains operatively interrelated with the valve operator and selectively, though separately and individually, actuated from the knob, one of said motion transmission trains being thrown out of action by said knob when the other is thrown into action whereby to manually adjust the valve operator or to place the valve operator under the control of said thermo-responsive power element.

ROY W. JOHNSON.